June 18, 1957
G. GAULTNEY
2,795,814
FISH HOLDING AND CLEANING BOARD
Filed Nov. 1, 1954
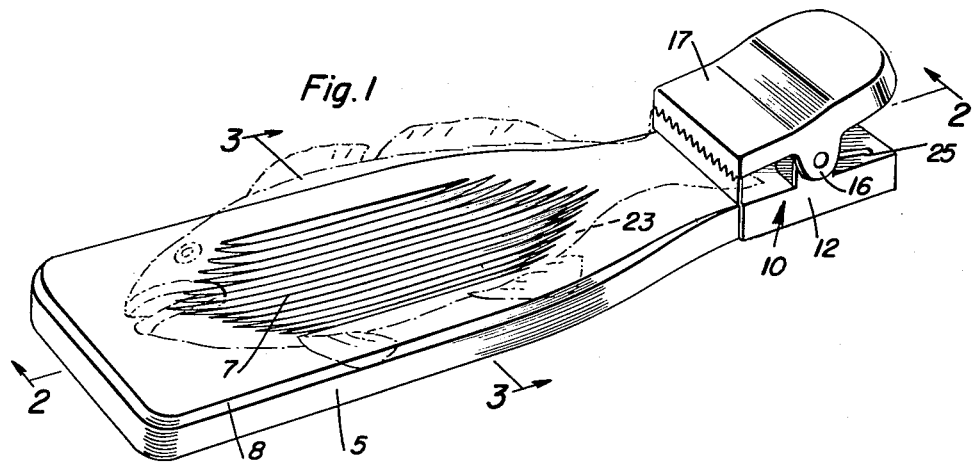
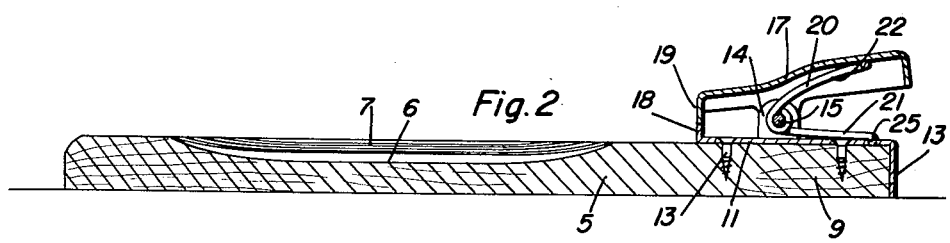
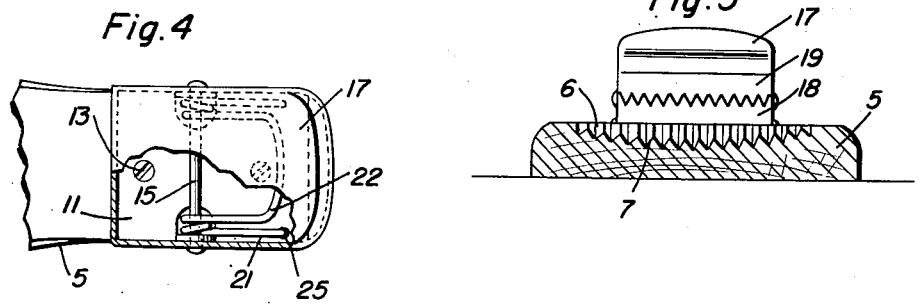
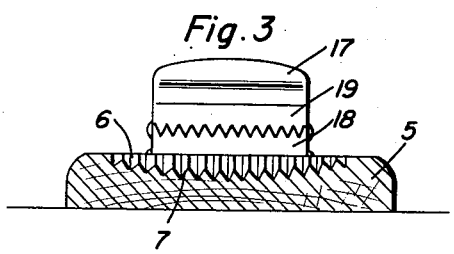
Gardner Gaultney
INVENTOR.
BY
Attorneys

United States Patent Office 2,795,814
Patented June 18, 1957

2,795,814

FISH HOLDING AND CLEANING BOARD

Gardner Gaultney, Bismarck, N. Dak.

Application November 1, 1954, Serial No. 466,051

1 Claim. (Cl. 17—8)

The present invention relates to new and useful improvements in fish cleaning devices and more particularly to a cleaning board equipped with clamping means to hold the tail of a fish firmly on the board while the fish is being scaled and cleaned.

An important object of the invention is to provide a fish cleaning board having a concaved surface to receive the underside of the fish to prevent the fish from sliding from side to side on the board while being scaled and cleaned and also to provide clamping means at one end of the board for clamping the tail of the fish.

Another object of the invention is to provide a novel tail clamp constructed with downwardly extending flanges to engage the sides and rear end of the board to effectively hold the clamp from becoming loose during frequent use thereof.

A still further object is to provide a device of this character of simple and practical construction, which is efficient and reliable in operation, relatively inexpensive to manufacture and otherwise well adapted for the purpose for which the same is intended.

These, together wth other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1 is a perspective view;

Figure 2 is a longitudinal sectional view taken on a line 2—2 of Figure 1;

Figure 3 is a transverse sectional view taken on a line 3—3 of Figure 1; and

Figure 4 is a fragmentary top plan view of the clamp with parts broken away and shown in section.

Referring now to the drawing in detail wherein for the purpose of illustration I have disclosed a preferred embodiment of the invention, the numeral 5 designates a fish cleaning board of elongated shape and preferably constructed of wood and having a longitudinal concaved area 6 in its upper surface. The concaved area 6 is formed with longitudinal parallel ribs 7 which are of gradually increased depth extending in a direction inwardly from the side edges of the concaved area to the central portion thereof. The side and front corners of the board are rounded or beveled, as shown at 8.

The rear end of the board tapers to a substantially square shaped rear end portion 9 and to which a clamp designated generally at 10 is secured. The clamp 10 includes a lower attaching plate 11 having downwardly projecting side flanges 12 and a downwardly projecting rear flange 13 positioned in close fitting engagement respectively at the sides and rear end of the square shaped rear portion 9 of the board. The plate ies secured to the board by screws or other suitable fasteners 13.

A pair of apertured ears 14 project upwardly adjacent the side edges of the plate 11 to receive a transverse positioned pin 15 and on which a pair of downwardly projecting apertured ears 16 of a clamping jaw 17 is pivoted.

The front of plate 11 is formed with a row of upstanding teeth 18 and the front end of jaw 17 is formed with a downwardly projecting row of teeth 19 arranged to mesh with the teeth 18.

A wire spring 20 is coiled at its central portion on the pin 15 and one end portion 21 of the spring is bent downwardly and anchored in an opening 25 in plate 11 while the other end portion 22 of the spring tensionally bears against the underside of jaw 17 at its rear portion to close the jaw.

In the operation of the device, a fish, which is designated by dotted lines at 23, is placed in the concaved portion 6 of the board 5 and with the tail of the fish clamped by the jaw 17. The underside of the fish fits substantially conformably in the concaved portion 6 of the board and the ribs 7 prevent tendency of the fish from sliding toward either side of the board while the fish is being scaled and cleaned and at the same time the tail of the fish is effectively held by the jaw 17 of the clamp.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A device by way of which a fisherman may expeditiously and satisfactorily scale and clean a fish comprising a flat board generally rectangular in plan and having narrowed handle and clamping means at one end thereof which, conjointly, enables the tail of the captive fish to be securely anchored and held while the fish is being scaled and cleaned, the top of said board having a centrally disposed concaved area in which a portion of the body of the fish may be lodged in a manner to stay put while the cleaning task is being carried out, said concaved area being of elongate form and being longitudinally fluted to provide a plurality of anti-slipping ribs which contribute to the over-all accommodation and retention properties of said board.

References Cited in the file of this patent

UNITED STATES PATENTS

| | | |
|---|---|---|
| 867,182 | Bahde | Sept. 24, 1907 |
| 1,632,194 | Possehl | June 14, 1927 |
| 2,110,341 | Rindt | Mar. 8, 1938 |
| 2,586,732 | Sohier | Feb. 19, 1952 |
| 2,607,070 | Wertz et al. | Aug. 19, 1952 |

FOREIGN PATENTS

| | | |
|---|---|---|
| 23,090 | Finland | Mar. 31, 1949 |